US011982434B1

(12) United States Patent
Egbert

(10) Patent No.: US 11,982,434 B1
(45) Date of Patent: May 14, 2024

(54) ORB LIGHT COVER DEVICE

(71) Applicant: Jasco Products Company LLC, Oklahoma City, OK (US)

(72) Inventor: Ryan Egbert, Oklahoma Cutt, OK (US)

(73) Assignee: Jasco Products Company, LLC, Oklahoma City, OK (US)

( * ) Notice: Subject to any disclaimer, the term of this patent is extended or adjusted under 35 U.S.C. 154(b) by 47 days.

(21) Appl. No.: 18/085,425

(22) Filed: Dec. 20, 2022

(51) Int. Cl.
*F21V 3/04* (2018.01)
*F21Y 115/10* (2016.01)

(52) U.S. Cl.
CPC ............. *F21V 3/04* (2013.01); *F21Y 2115/10* (2016.08)

(58) Field of Classification Search
CPC ............................... F21V 3/04; F21Y 2115/10
See application file for complete search history.

(56) References Cited

U.S. PATENT DOCUMENTS 9,719,654 B2 8/2017 Chien
10,859,221 B2 12/2020 Chien
10,989,378 B2 4/2021 Chien
11,156,352 B1 * 10/2021 Li ........................... H04R 3/00
11,181,249 B2 * 11/2021 Chien ................... F21S 10/002
11,281,083 B1 * 3/2022 Xin ...................... G03B 21/145
2010/0296300 A1 * 11/2010 Chiu ....................... F21S 6/001 362/363
2015/0211701 A1 * 7/2015 Chien ....................... F21V 7/00 362/235
2017/0038031 A1 * 2/2017 Chien ....................... F21V 5/00

FOREIGN PATENT DOCUMENTS

CN 209960355 U * 1/2020

* cited by examiner

*Primary Examiner* — Zheng Song
*Assistant Examiner* — Glenn Zimmerman
(74) *Attorney, Agent, or Firm* — William Popejoy

(57) ABSTRACT

The present invention pertains to a device or devices which heavily diffuse projected light while maintaining sufficient translucent properties to provide illumination to an area. The device comprises a lighting device with contained motion light. The invention transforms a device that projects motion projectable light onto a wall, ceiling or other surface into a device which provides contained tabletop lighting. Embodiments described for the present invention comprise a projectable light base with at least one LED light source, a hollow spherical cover, where the hollow spherical cover is configured to capture LED light beams, emitted from the projectable light base, shown onto a surface to produce a colorful light pattern, design, or moving image. The hollow spherical cover is configured to display a colorful light pattern, design, or moving image, and illuminate an area with soft light. The hollow spherical cover is comprised of translucent material.

13 Claims, 7 Drawing Sheets

ORB LIGHT COVER DEVICE

BACKGROUND OF THE INVENTION

1. Field of the Invention

The present invention pertains to devices which illuminate an area and illuminate a surface with a colorful light pattern, design, or moving image. More specifically, the invention pertains to a device or devices which heavily diffuse projected light while maintaining sufficient translucent properties to provide illumination to an area.

2. Description of the Related Art

Projected light patterns, designs, or moving images produced from light-emitting diodes (LED) are commonly found in lighting apparatuses. These images are often cast onto a wall, ceiling, or other surface. The light beams emitted from the LED or other light source may be transformed by one or more optical elements. The beams may be reflected, refracted, or pass through shaped openings, windows, or cutouts. Images may obtain movement through motorized functions, and systematic, sequential, or random timing of power supplied to the light source.

Tabletop light sources are commonly found, and serve a variety of functional and aesthetic purposes, including: illumination to an area, nightlight, seasonal lighting, reading illumination, among others. Some tabletop lights may have a shade or cover which controls the dispersement of light beams from a light source.

U.S. Pat. No. 9,719,654 discloses a LED or laser light device having a plug-in power source, an interchangeable power source, or a USB power source. The device incorporates more than one optical element having more than one reflective or refractive surfaces at different positions, distances, or orientations relative to the LEDs or laser-light source of the LED or laser light. Light beams reflect or refract before passing through the optical elements and create or project an image, message, time, geometric art, nature scene, galaxy, milky way, sky, cloud, start, moon, water-wave, aurora light, animal, characters, cartoon, sign, logo, commercial to at least one surface surrounding the light device. The optical elements may have a predetermined texture and/or shaped openings, windows, cutouts, or variable thicknesses and further may incorporate parts and accessories such as a motor to provide moving image effects with a wide viewing angle and variable colors or patterns.

U.S. Pat. No. 10,859,221 discloses a LED projection night light for night time or dark area use which includes a plug-in wall outlet night light or direct current operated night light with projection features to project an image, message, data, logo, or time on a ceiling, walls, floor, or other desired surface. The LED night light incorporates optics-lens with a preferred focus calculation to create a bigger image to shown on locations. The device may comprise the following parts: an optics-lens, slides, openings, or cut-outs, and/or a transparent material piece, translucent material piece, telescope assembly, housing-member, slide-film, slide-disc, elastic-member, tilt-means, rotating means, adjust-means, roller-means, mechanical-means, extend-means, convex lens, and/or concave lens designed to make the desired image, message, data, logo, or time project to the ceiling, walls, floor, or other desired surface to be seen by a viewer. The LED light upgrade model has an interchangeable power source arrangement, permitting the night light to be selectively powered by either an AC powered sealed-unit or a DC powered battery pack.

U.S. Pat. No. 10,989,378 discloses a LED or laser light string which has more than one light performance function. The device comprises LED or-and laser light bulb which has a built-in LED or laser or both to offer the one or more LED or-and laser light performance or functions select from illumination, projection, party light, lighted patterns, light beams, lighted image, flood light, color changing light garden torch light, garden landscape light string or other light string. The device contains circuitry and controller built-in only light string to configure the LED or-and laser light sources to turn-on and turn-off.

SUMMARY OF THE INVENTION

The present invention comprises a lighting device with contained motion light. The invention transforms a device that projects motion projectable light onto a wall, ceiling or other surface into a device which provides contained tabletop lighting.

Embodiments described for the present invention comprise a projectable light base with at least one LED light source, a hollow spherical cover, where the hollow spherical cover is configured to capture LED light beams, emitted from the projectable light base, shown onto a surface to produce a colorful light pattern, design, or moving image. The hollow spherical cover is configured to display a colorful light pattern, design, or moving image, and illuminate an area with soft light. The hollow spherical cover is comprised of translucent material.

Embodiments of the cover may comprise a heavily frosted or milky surface to heavily diffuse the projected light beams from the at least one LED light source. The attaching or detaching of the cover prevents or enables the light from casting onto a ceiling, wall, or other surface. A locking mechanism secures the cover to the projectable light base.

It should be appreciated that combinations of the foregoing concepts and additional concepts discussed in greater detail below are contemplated as being part of the inventive subject matter disclosed herein. In particular, all combinations of claimed subject matter appearing at the end of this disclosure, or elsewhere herein, are contemplated as being part of the inventive subject matter.

These and other systems, methods, objects, features, and advantages of the present invention will be apparent to those skilled in the art from the following detailed description of the preferred embodiment and the drawings.

BRIEF DESCRIPTION OF THE DRAWINGS

One or more embodiments are illustrated by way of example, and not by limitation, reference will now be made to the accompanying drawings, having the same numeral designations to represent like elements throughout and wherein.

Figure 1:
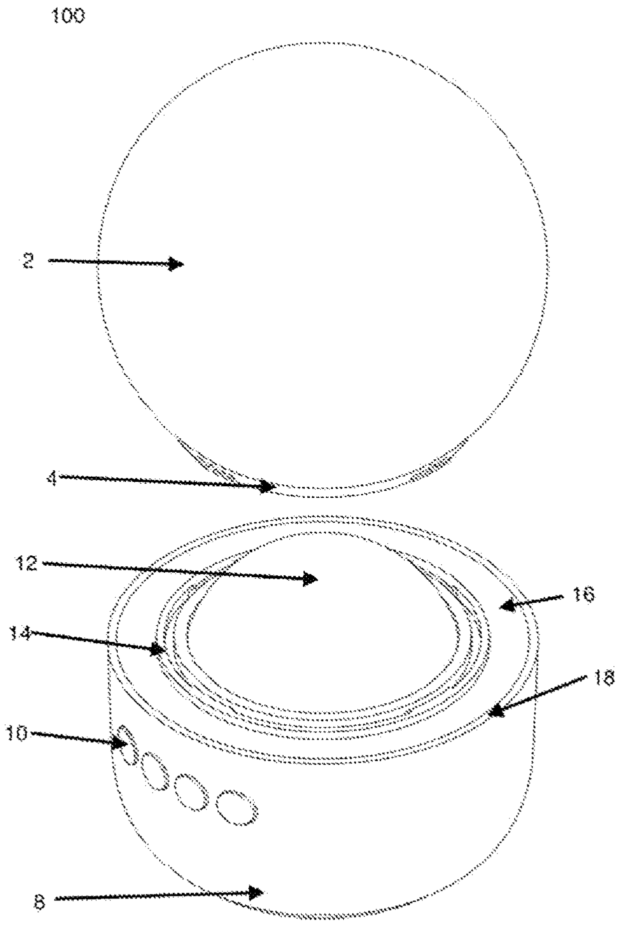
FIG. 1 shows a perspective view of an embodiment of a device.

While the invention has been described in connection with certain preferred embodiments, other embodiments would be understood by one of ordinary skill in the art and are encompassed herein.

ELEMENTS WITH CORRESPONDING REFERENCE NUMERALS

Orb light cover device 100
Spherical cover 2
Spherical cover rim 4
Locking tab 6
Base 8
Pushbuttons 10
Dome lens 12
Spherical cover locking mechanism 14
Base top outer ring 16
Base top edge 18
Base bottom 20
Spherical cover cavity 22
LED 24
Lens disc 26
Dome lens interior side 28

DETAIL DESCRIPTION OF THE INVENTION

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in order to facilitate describing the subject innovation. Moreover, it is to be appreciated that the drawings may not be to scale.

FIG. 1 shows a perspective view of an embodiment of an orb light cover device 100. In this illustration, a spherical cover 2 is detached from a projection light base 8. When the spherical cover 2 is detached, light beams are projected through a dome lens 12 and may cast onto a ceiling, wall or other surface. The projected light may create an ambient light, whole room environment. The dome lens 12 is visible when the spherical cover 2 is detached.

In this embodiment, the dome lens 12 is clear transparent and configured to provide low diffusion of light. Light beams traveling through the dome lens may be distorted by varying patterns and thickness of the lens. Minimal light is lost, and the ceiling and surroundings receive maximum light exposure. An entire room may be provided illumination from the light beams traveling through the dome lens 12.

The spherical cover rim 4 of the spherical cover 2 attaches to base 8 by twisting into the grooves of the spherical base locking mechanism 14. The attachment of the spherical cover 2 to the base 8 transforms a projection light into a contained motion light.

In this embodiment, the base 8 is comprised of a base top outer ring 16 and a base top edge 18. Both the base top outer ring 16 and the base top edge 18 may aide in the handling of the device and provide an aesthetically pleasing design element. A user may hold the base 8 with one or two hands hand, while one or more thumbs secure the base top outer ring 16.

Device lighting and user functions may be controlled through pushbuttons 10 on the base 8 of the device. In some embodiments, timer control, dimming, temperature control, motion, motion detection, occupancy detection, and sound may all be functionally controlled by the pushbuttons 10. Embodiments of the device may further comprise remote control, app control, or other external control means.

Figure 2:
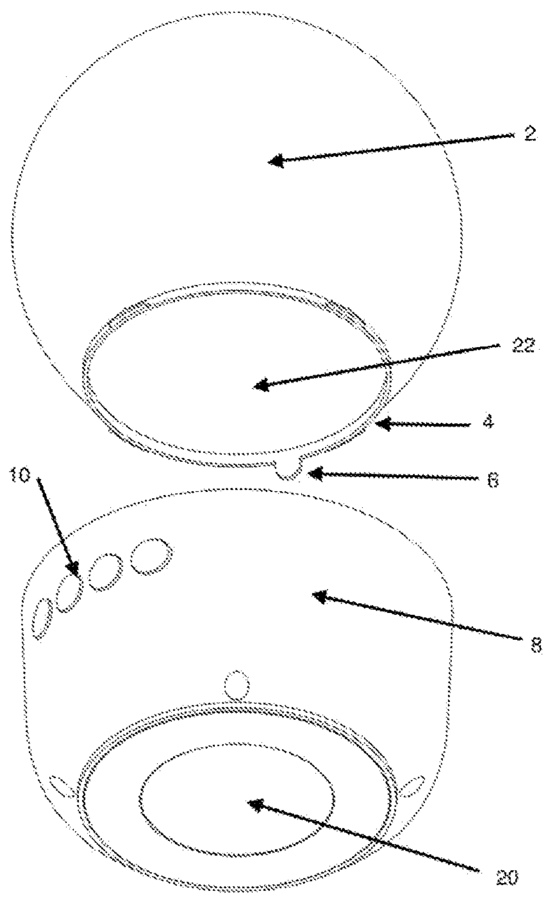
FIG. 2 shows a perspective view of an embodiment of the device.
Figure 3:
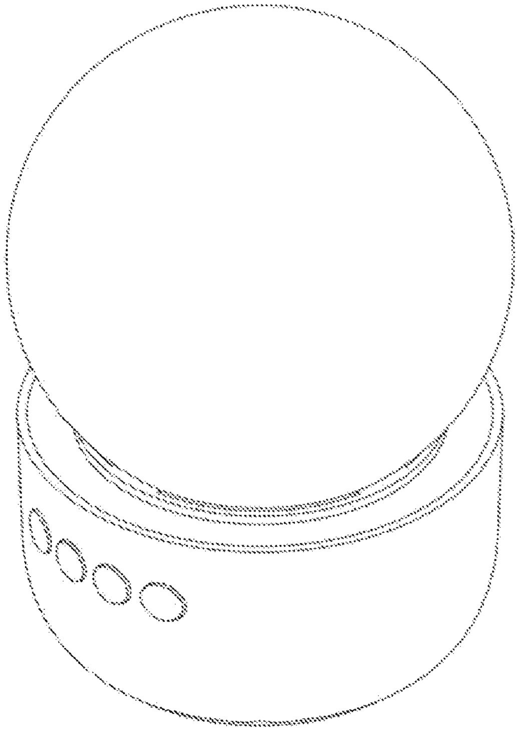
FIG. 3 shows a perspective view of an embodiment of the device.
Figure 4:
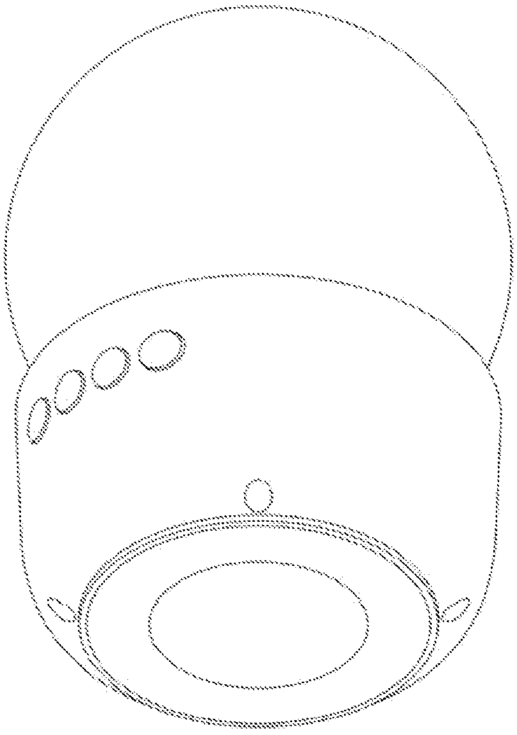
FIG. 4 shows a perspective view of an embodiment of the device.

FIG. 2 shows another perspective view of an embodiment of the device. A locking tab 6 of the spherical cover rim 4 helps secure the spherical cover 2 to the spherical base locking mechanism 14. A user-controlled twisting motion of the spherical cover 2 applied to the base 8 provides a consistent and strong attachment. The spherical cover 2 is removed by a twisting motion in an opposite direction of the attachment twisting motion. A base bottom 20 may be comprised of various materials which provide a stable foundation and slide resistance for the device.

Figure 5:
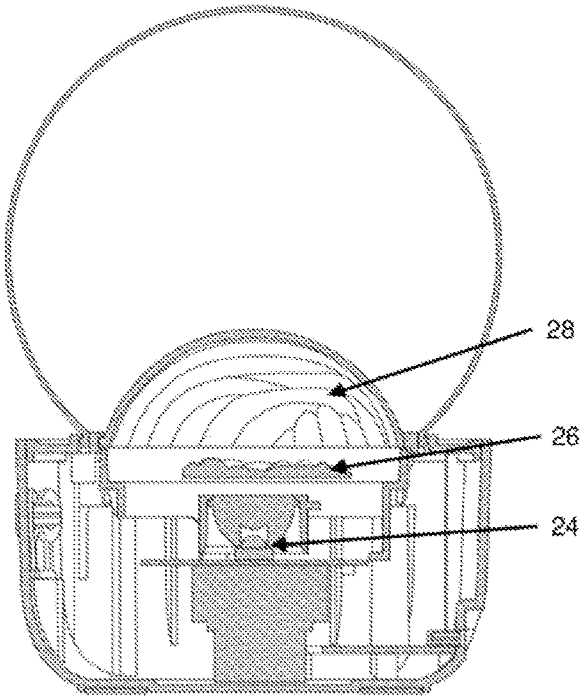
FIG. 5 shows a cross sectional view of an embodiment of the device.

FIG. 5 shows a cross sectional view of an embodiment of the device. In this embodiment, the spherical cover 2 is attached to the base 8. A lens disc 26 distorts light beams emitting from a LED 24 or other light emitting source. The lens disc 26 be comprised of a wavy, textured effect on at least one side. The lens disc 26 may rotate within the dome lens interior side 28. The rotation creates waving movement, motion. The lens disc 26 rotates via a mechanized motor (not shown) within the base. The mechanized motor is physically connected to the center of the lens disc 26 and rotates the lens disc around a central pivot.

The LED 24 is offset to one side of the lens disc 26. LED light shines through the lens disc 26, and then through the dome lens 12. The motorized rotation of the lens disc 26 produces the motion of the projected light. Light emission varies as the light beams pass through the rotating, heavily textured lens disc 26, which may have varying thickness. Light emission may be further distorted by the dome lens interior side 28. The dome lens interior side 28 may be comprised of varying patterns, textures, and thickness.

Figure 6:
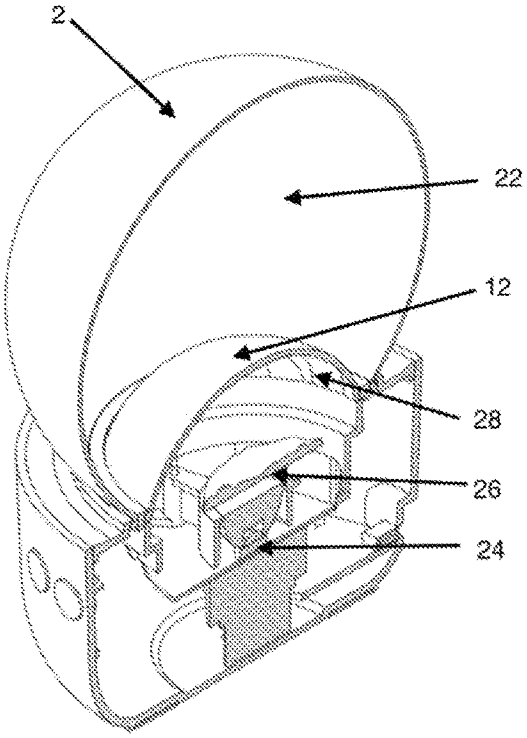
FIG. 6 shows a perspective cross sectional view of an embodiment of the device.
Figure 7:
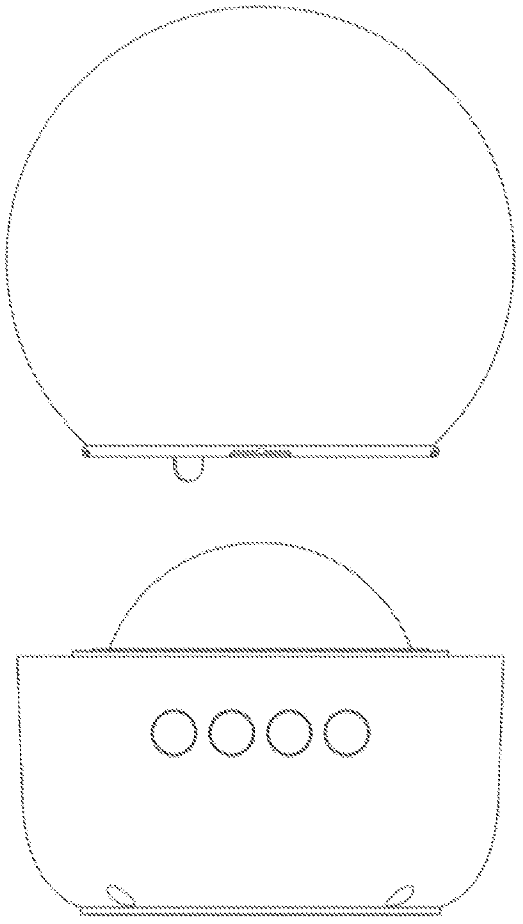
FIG. 7 shows a front elevational view of an embodiment of the device.
Figure 8:
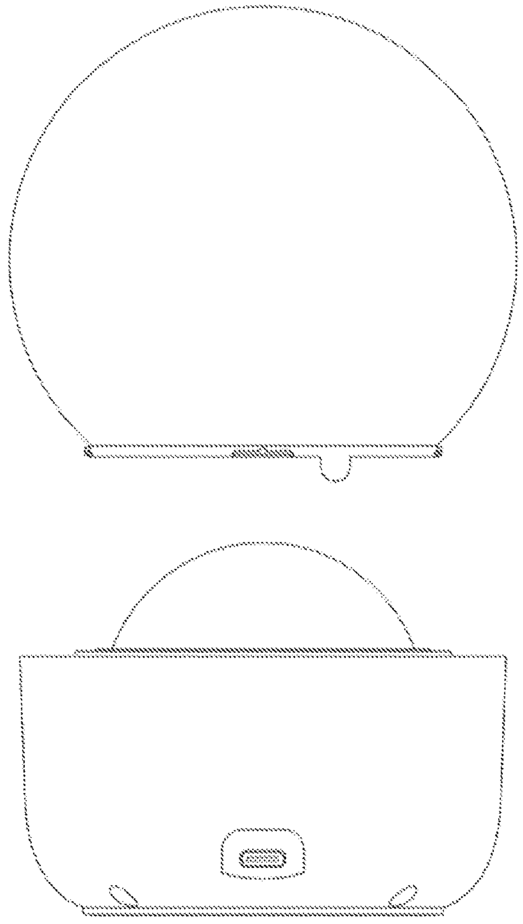
FIG. 8 shows a rear elevational view of an embodiment of the device.
Figure 9:
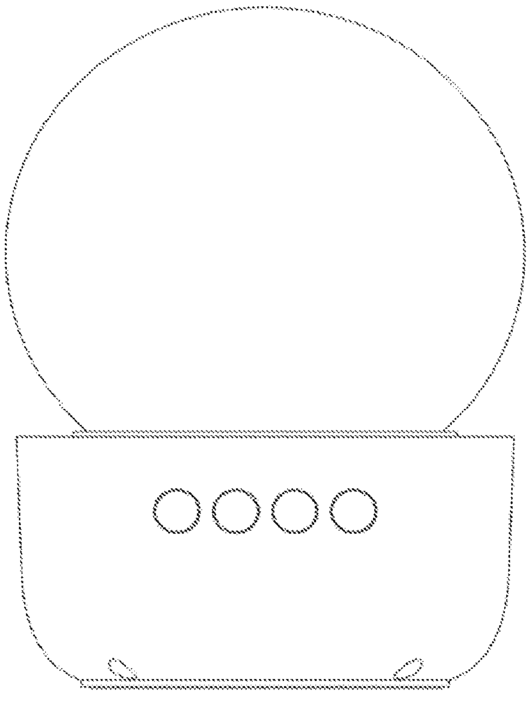
FIG. 9 shows a front elevational view of an embodiment of the device.
Figure 10:
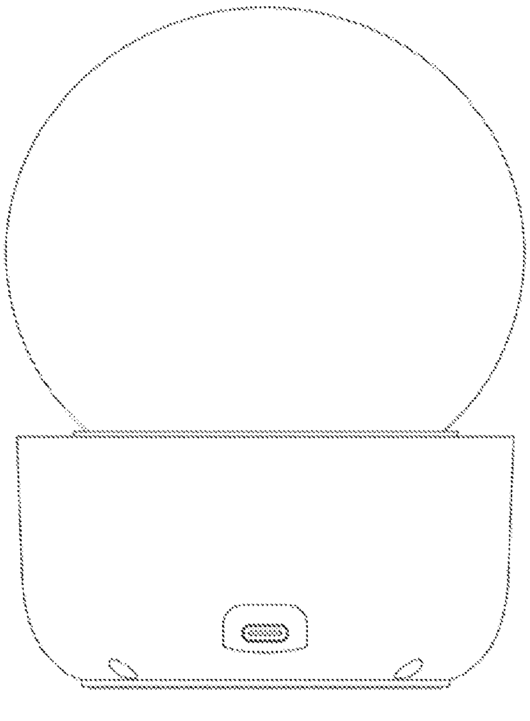
FIG. 10 shows a rear elevational view of an embodiment of the device.
Figure 11:
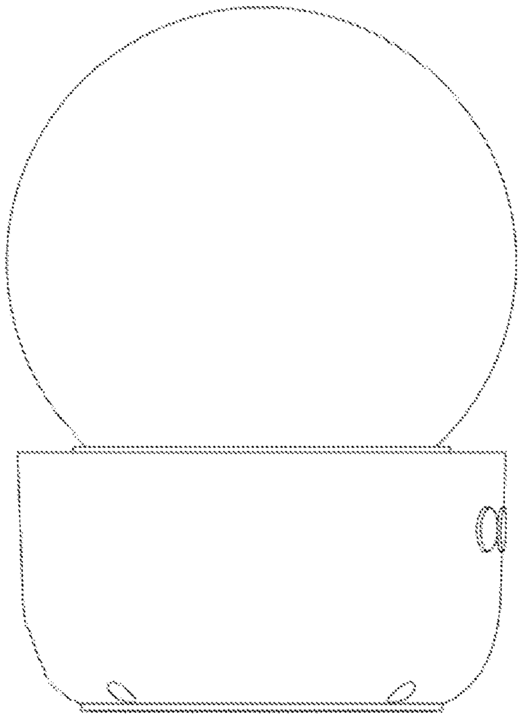
FIG. 11 shows a light side elevational view of an embodiment of the device.
Figure 12:
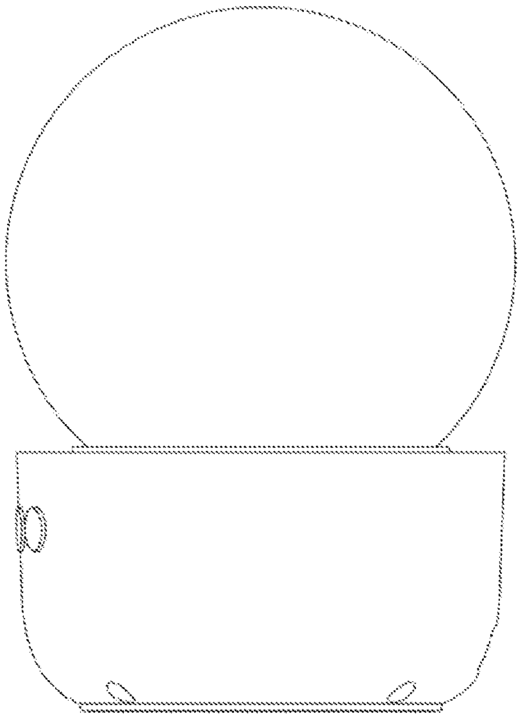
FIG. 12 shows a right side elevational view of an embodiment of the device.
Figure 13:
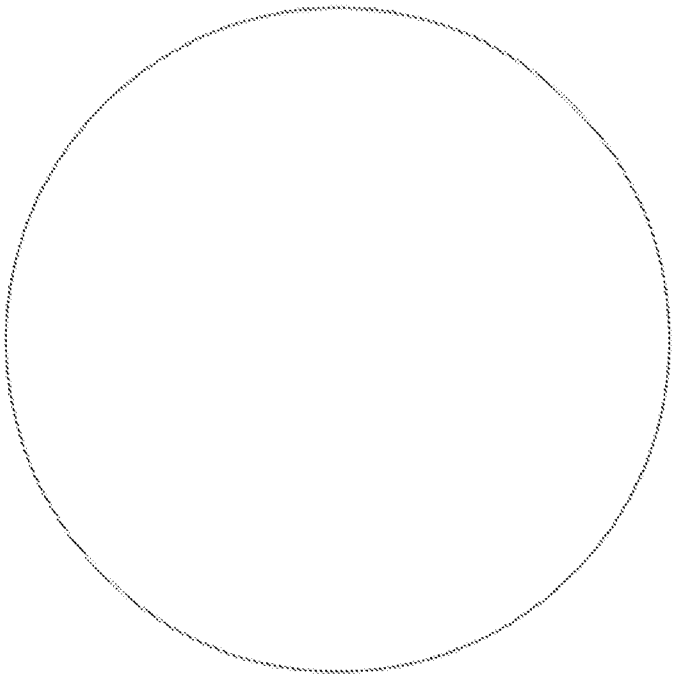
FIG. 13 shows a top plan view of an embodiment of the device.
Figure 14:
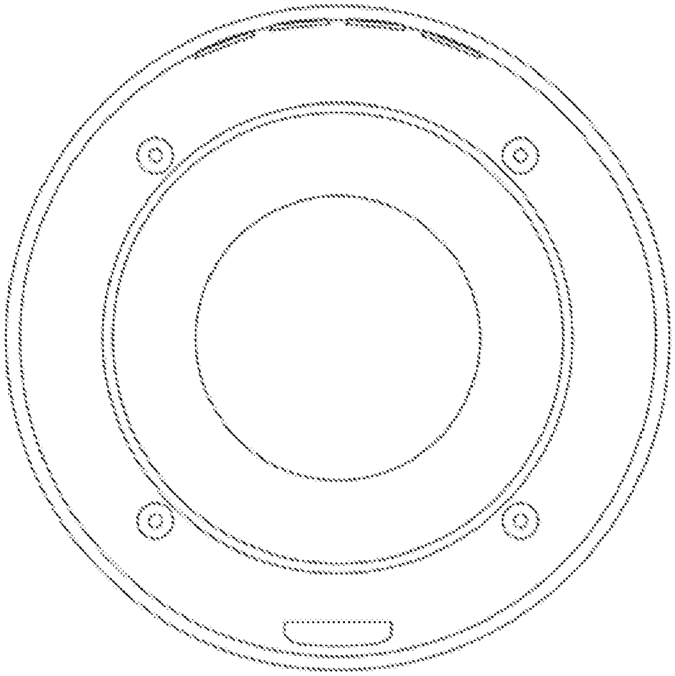
FIG. 14 shows a top plan view of an embodiment of the device.

FIG. 6 shows a perspective cross sectional view of an embodiment of the device. The spherical cover 2 creates a spherical cover cavity 22. Light beams travel through and from the dome lens 12 and throughout the spherical cover cavity 22. In this embodiment, the spherical cover 2 is constructed with a milky or frosted finish configured to heavily diffuse and contain light. The spherical cover 2 contains translucent properties which allows enough emitted light to produce a swirling light via the mechanized motor, and the spherical cover 2 contains sufficiently opaque properties to prevent the light emitted through the dome lens from projecting further onto a ceiling, wall or its surroundings.

Although the present invention has been described in relation to particular embodiments thereof, many other variations and modifications will become apparent to those skilled in the art. It is preferred, therefore, that the present invention be limited not by the specific disclosure herein, but only by the appended claims. Alternate embodiments may be devised without departing from the spirit or scope of the invention. Further, the particular feature or structure may be combined in any suitable manner in one or more embodiments.

What is claimed is:

1. An orb light device, comprising:
at least one LED light source;
a lens disc, whereas the lens disc is comprised of a central pivot point;
a lens disc mechanized motor, whereas the lens disc mechanized motor is physically connected to the center of the lens disc and rotates the lens disc around the central pivot point;
the at least one LED light source is configured to be offset to the central pivot point of the lens disc;
a dome lens, whereas the dome lens is comprised of varying patterns and thickness;
a hollow spherical cover;
the hollow spherical cover is comprised of translucent material;
the hollow spherical cover configured to capture LED light beams emitted from a projectable light device which display a colorful light pattern, design, or moving image onto a ceiling, wall, or other surface;
the hollow spherical cover is configured to limit a size of the colorful light pattern, design, or moving image, whereas the hollow spherical cover is configured to be the only optical element limiting the size of the colorful light pattern, design, or moving image;
the dome lens is interiorly located within the hollow spherical cover, whereas the entirety of the dome lens is configured to be located within the geometric spherical shape of the hollow spherical cover, whereas the dome lens is configured to distort the LED light beams emitted from the at least one LED light source entirely within the hollow spherical cover configured to limit the size of the colorful light pattern, design, or moving image;
the hollow spherical cover displays the colorful light pattern, design, or moving image, whereas the colorful light pattern, design, or moving image is visible on the hollow spherical cover of the orb light device; and
the hollow spherical cover configured to illuminate an area with soft light.

2. The orb light device of claim 1, further comprising:
the dome lens is hemispherical.

3. The orb light device of claim 1, further comprising:
the hollow spherical cover is configured to produce a moving, cloudy lighting feature.

4. The orb light device of claim 1, further comprising:
the hollow spherical cover is configured to be removable; and
the removal of the hollow spherical cover is configured to permit projectable LED light beams to display the colorful light pattern, design, or moving image onto a surface.

5. The orb light device of claim 1, further comprising:
a spherical cover cavity within the hollow spherical cover.

6. An orb light device, comprising:
a projectable light base comprising:
at least one LED light source;
a lens disc, whereas the lens disc is comprised of a central pivot point, whereas
a lens disc mechanized motor, whereas the lens disc mechanized motor is physically connected to a center of the lens disc and rotates the lens disc around the central pivot point;
the at least one LED light source is configured to be offset to the central pivot point of the lens disc;
a dome lens, whereas the dome lens is comprised of varying patterns and thickness;
a hollow spherical cover;
the dome lens is interiorly located within the hollow spherical cover, whereas the entirety of the dome lens is configured to be located within the geometric spherical shape of the hollow spherical cover, whereas the dome lens is configured to distort the LED light beams emitted from the at least one LED light source entirely within the hollow spherical cover configured to limit the size of the colorful light pattern, design, or moving image;
the hollow spherical cover configured to capture LED light beams emitted from a projectable light device which display a colorful light pattern, design, or moving image onto a ceiling, wall, or other surface;
the hollow spherical cover is configured to limit a size of the colorful light pattern, design, or moving image, whereas the hollow spherical cover is configured to be the only optical element limiting the size of the colorful light pattern, design, or moving image;
a hollow spherical cover cavity, whereas the hollow spherical cavity is configured to permit light emitted from the at least one LED light source, and distorted by the lens disc and the dome lens to travel without further distortion, unless contacted by other at least one LED light source emissions, until contacting the hollow spherical cover;
the hollow spherical cover configured to display the colorful light pattern, design, or moving image, whereas the colorful light pattern, design, or moving image is visible on the hollow spherical cover of the orb light device; and
the hollow spherical cover configured to illuminate an area with soft light.

7. The orb light device of claim 6, further comprising:
the hollow spherical cover is comprised of translucent material.

8. The orb light device of claim 6, further comprising:
the hollow spherical cover configured to produce a moving, cloudy lighting feature.

9. The orb light device of claim 6, further comprising:
the hollow spherical cover is configured to be removable; and
the removal of the hollow spherical cover is configured to permit projectable LED light beams to display the colorful light pattern, design, or moving image onto a surface.

10. The orb light device of claim 6, further comprising:
the at least one LED light source emits projectable light that travels through the spherical cover cavity within the hollow spherical cover; and
the hollow spherical cover is configured to capture projectable light.

11. The orb light device of claim 6, further comprising:
the dome lens is clear transparent and configured to provide low diffusion of light.

12. The orb light device of claim 6, further comprising:
a spherical base locking mechanism;
a spherical cover locking tab; and a spherical cover rim configured to secure the spherical cover to the spherical base locking mechanism.

13. An orb light device, comprising:

at least one LED light source;

a lens disc, whereas the lens disc is comprised of a central pivot point;

a lens disc mechanized motor, whereas the lens disc mechanized motor is physically connected to the center of the lens disc and rotates the lens disc around the central pivot point;

the at least one LED light source is configured to be offset to the central pivot point of the lens disc;

a dome lens, whereas the dome lens is comprised of varying patterns and thickness;

a hollow spherical cover;

the hollow spherical cover is comprised of translucent material;

the hollow spherical cover configured to capture LED light beams emitted from at least one LED light source;

the hollow spherical cover is configured to limit a size of the colorful light pattern, design, or moving image, whereas the hollow spherical cover is configured to be the only optical element limiting the size of the colorful light pattern, design, or moving image;

the dome lens is interiorly located within the hollow spherical cover, whereas the entirety of the dome lens is configured to be located within the geometric spherical shape of the hollow spherical cover, whereas the dome lens is configured to distort the LED light beams emitted from the at least one LED light source entirely within the hollow spherical cover configured to limit the size of the colorful light pattern, design, or moving image;

the hollow spherical cover displays the colorful light pattern, design, or moving image, whereas the colorful light pattern, design, or moving image is visible on the hollow spherical cover of the orb light device; and the hollow spherical cover configured to illuminate an area with soft light.

* * * * *